Patented Aug. 8, 1950

2,517,760

UNITED STATES PATENT OFFICE 2,517,760

2-(p-ISOTHIOCYANOBENZENESULFON-AMIDO)-PYRIMIDINE

Ralph W. Bost, Chapel Hill, N. C., and Robert S. Shelton, Mariemont, Ohio, assignors to The Wm. S. Merrell Company, Cincinnati, Ohio, a corporation of Delaware No Drawing. Application November 4, 1947, Serial No. 784,086

1 Claim. (Cl. 260—239.75)

This invention relates to the chemical compound 2-(p-isothiocyanobenzenesulfonamido)-pyrimidine and to a method for the preparation thereof.

The aforementioned compound is prepared, for example, by dissolving 16 gms. (0.064 mole) of sulfadiazine in 200 ml. of water containing 25 ml. of concentrated hydrochloric acid. To this solution there is added at about room temperature 7.4 gms. (0.064 mole) of thiophosgene in one portion. The reaction mixture is stirred immediately after the addition thereto of the thiophosgene, and the stirring is continued until all the red color of the thiophosgene has disappeared from the reaction mixture. The desired product precipitates in the form of white crystals, and is filtered off and washed thoroughly with water. The product is then further purified by recrystallization in known manner from a mixture of dioxane and water. By following in the laboratory the procedure just described, there has been obtained by experiment 17.7 gms. of substantially pure 2-(p-isothiocyanobenzenesulfonamido)-pyrimidine (i. e., 2-(p-isothiocyanobenzenesulfonamido)-1,3-diazine) which melted with decomposition at 237–240° C. and analyzed 22.02% sulful by weight.

The compound herein described is a useful therapeutic agent, and is particularly useful when employed as a tuberculostatic agent.

The compound may be administered orally, at dosage levels of, for example, 100 mg., six times daily. For such administration it is conveniently put into tablet form, although it may be put into any of the other forms commonly used for oral administration.

We claim:

2-(p-isothiocyanobenzenesulfonamido)-pyrimidine.

RALPH W. BOST.
ROBERT S. SHELTON.

REFERENCES CITED

The following references are of record in the file of this patent:

FOREIGN PATENTS

| Number | Country | Date |
|--------|---------|------|
| 517,682 | Great Britain | Feb. 6, 1940 |

OTHER REFERENCES

Moore et al.: J. Am. Chem. Soc., vol. 64, pp. 1572–1575 (1942).